Sept. 15, 1959 — P. W. SANDS — 2,903,987
HYDRAULIC BULGE FIXTURE
Filed Nov. 29, 1954 — 3 Sheets-Sheet 1

INVENTOR
Peter W. Sands
BY
ATTORNEY

Sept. 15, 1959     P. W. SANDS     2,903,987
HYDRAULIC BULGE FIXTURE

Filed Nov. 29, 1954     3 Sheets-Sheet 2

INVENTOR
Peter W. Sands
BY Robert M. Denning
ATTORNEY

Sept. 15, 1959  P. W. SANDS  2,903,987
HYDRAULIC BULGE FIXTURE
Filed Nov. 29, 1954  3 Sheets-Sheet 3
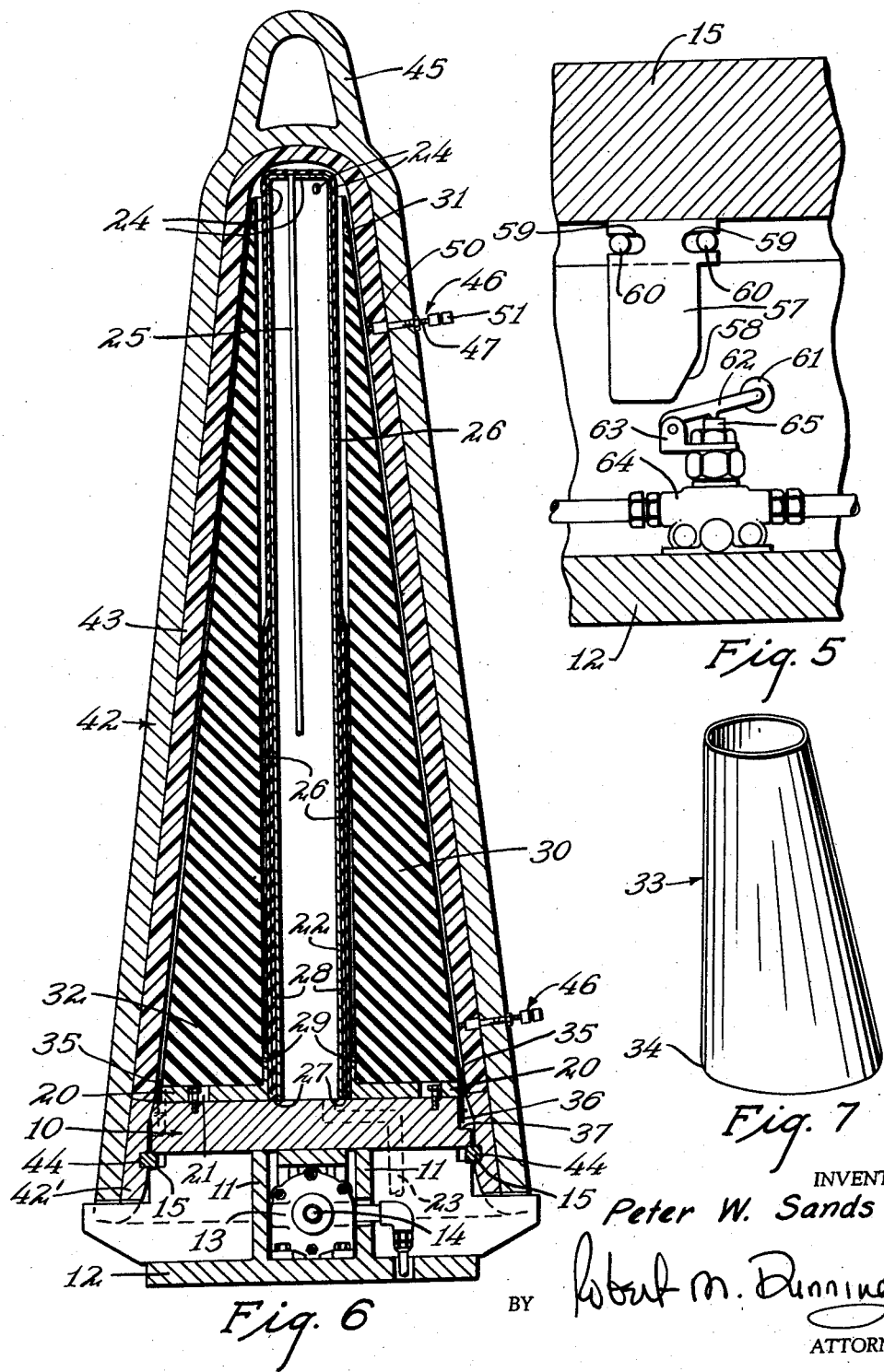
INVENTOR
Peter W. Sands
BY Robert M. Dunning
ATTORNEY United States Patent Office 2,903,987
Patented Sept. 15, 1959

2,903,987

HYDRAULIC BULGE FIXTURE

Peter W. Sands, St. Paul, Minn., assignor to Seeger Refrigerator Co., Ramsey County, Minn., a corporation of Minnesota Application November 29, 1954, Serial No. 471,697

11 Claims. (Cl. 113—44)

This invention relates to an improved cone molding method and structure therefor. More particularly, the invention concerns providing a new and useful mechanical arrangement for hydraulically producing aluminum bulge fixtures of substantially cone shape and an improved method of molding.

Usually in molding and shaping thin shelled metals and plastics there is the problem of securing a structure with a rapidly and positively operating locking arrangement between the mold and its base. Also, in shaping and forming it is difficult to obtain a close tolerance for subsequently interfitting and connecting a plurality of formed parts of uniform and gradually increasing diameters. Heretofore, in molding shapes of the form herein described, preforming as by drop hammering or spinning has been required.

Accordingly, it is an object of this invention to provide a new and useful improvement in the method of bulge molding.

Another object is to provide a new and useful improvement in a mechanical arrangement for molding cone shaped structures.

A further object is to provide a new and useful hollow conical rubber form which is self contracting to natural shape to return compressing fluid from the mold housing embodied in this disclosure.

Another object of this invention is to provide a new and useful arrangement of molding structure wherein the pressurized molding fluid is confined to an expansible and contractable container which acts upon an expansible and self-contractable molding form.

Another object in providing in this new and useful process of molding a single piece or part in different diameters with a control against the vertical component of pressure during and after molding.

Another object is to provide a hollow molding tube of substantially uniform internal diameter and a cone shaped external diameter which expands under pressure first and last at the small end of the cone in the structural arrangement embodied in this disclosure.

Another object is to provide a new and useful method and apparatus for molding uniform cone shapes by the combined operation of a hydraulic control with the application of fluid pressure to preform the results embodied in this disclosure.

An additional object is to provide a new and useful mechanical arrangement and system for locking the mold housing to seal and release the molding pressure.

Further objects and advantages will be apparent from the following description of the accompanying drawings wherein:

Fig. 5 is a plan view in partial cross section showing the locking ring control of a hydraulic valve.

Fig. 6 is a detailed cross section view of the mold assembly with a modified mold form.

Fig. 7 is an elevation of a mold piece.

With reference to the drawings, like parts will be indicated by similar markings.

In order to more conveniently illustrate the operation of the molding device as herein described the structure of the mold assembly will be first indicated in order to describe the control assembly and its relationship thereto.

Figure 1:
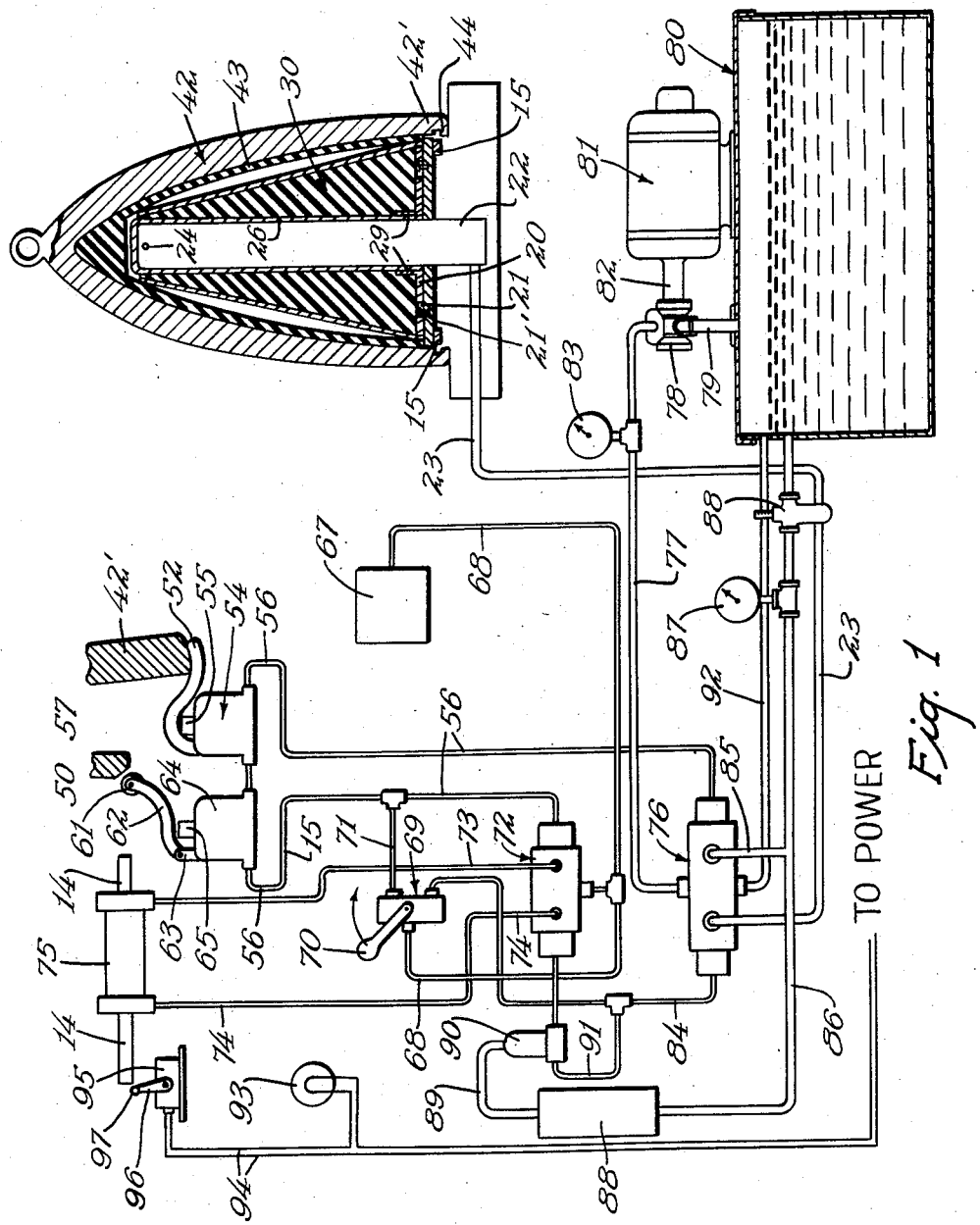
Fig. 1 is a diagrammatic plan arrangement of the mold operating system with a mold unit illustrated in cross section.

In forming a molded aluminum ring or cone shaped object the mold form must be of a shape, as illustrated to produce the end product of desired configuration. Accordingly, as illustrated in Fig. 1, the cone shape to be formed is provided with a bulge to give a rounded appearance or bullet shape. Whereas, in Fig. 6 the cone is formed without the bulge in a basically similarly constructed molding arrangement shown in more detail.

Figure 2:
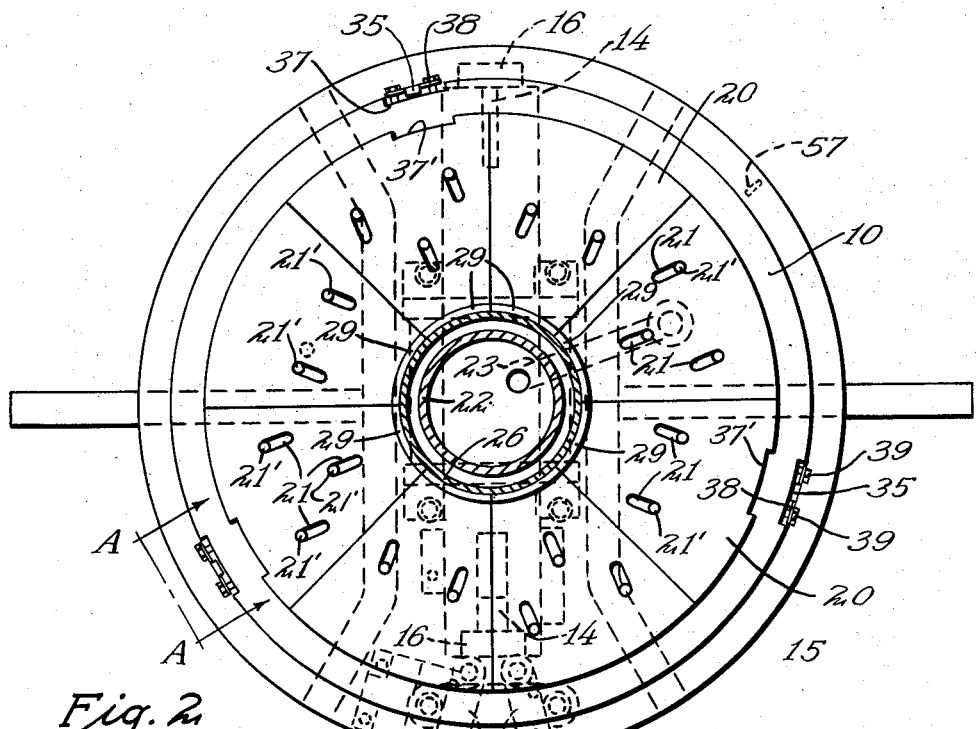
Fig. 2 is a top view of the base of the mold with the mold housing removed.

As illustrated in the more detailed drawing shown in Fig. 6 supplemented by other figures, the molding unit comprises a stationary platform or base 10 mounted on frame supports 11 between which is placed on the frame work portion 12 a hydraulic cylinder 13 provided with a pair of arms 14. The arms 14, through the hereinafter described pivotal linkage, expand and contract locking ring 15. The locking ring 15 is formed in two half circular parts, the ends of which are shown in Fig. 2 as connected to arm 14 carrying an integral or otherwise attached plates 16 (one unit of which is shown in detail). The plates 16 are provided with pins 17 upon which are mounted a pair of pivotal linkages 18 connected to pins 19 on the adjacent ends of the locking ring sections 15. A reciprocal motion of the arms 14, produced by the system as hereinafter described, causes the linkages 18 to expand and contract the two sections of the locking ring 15.

Set on the base 10 are a plurality of slightly movable protective plate seconds 20. The plates 20 are provided with elongated slotted apertures 21 which fit around and allow the plates 20 to slide by, or reciprocate with respect to bolts 21' secured in the base plate 10. The slots 21 allow the plates 20 to have a limited displacement upon a molding operation and bolts 21' permit the plates 20 to be freely laid on or lifted from base 10.

Centered on and welded to the base 10 is a metal tube 22 which is connected by conduit 23 to a hydraulic fluid source, as hereinafter described. At the upper end of tube 22 there is provided one or more orifices or ports 24 for flow of oil or other pressure molding fluid. An air bleeder pipe 25 depends from the top aperture 24 down into tube 22 and extends substantially the full length of the tube 22. The bleeder pipe 25 aids in return flow of oil from the mold into conduit 23, to the source of supply. A removable closed sleeve bag 26, formed of flexible sheet rubber, encloses the exterior top and side portions of tube 22, and the bag 26 at its base is doubled back on itself inwardly and upwardly from its lower edge at the base 27 to form a fluid sealing wall 28. When filled with oil, wall 28 remains in fluid tight relationship against tube 22. The tube 22, bag 26 and wall 28 are kept from being blown out, under pressure, by the forward walls 29 of plates 20. Mounted on the plates 20 about tube 22 and bag 26 is a heavy hollow conical vulcanized rubber form or cone 30 having a relatively thinner top section 31 and a thick heavy base section 32. The provision of the heavy base section 32 with a gradually diminishing cross sectional intermediate outside diameter extending to the top section 31 affords a vertical control of pressure both in the molding operation and return flow of pressure creating fluid. The cone 30 is expansible under high molding pressure of 300 to 3000 p.s.i. and self-contracting when the pressure is released. The slight movement of plates 20 with respect to slots 21 allow for slight expansion of the rubber cone base section 32 and bag 26 at its base 27.

In preforming a molding operation a circular ring, tube or cone 33 of rough manufacture is placed over the heavy rubber cone 30 with its lower edge portion 34 extending under the hooks 35 which are provided on holding base plates 36. The hooks 35 are mounted on plates 36, which are in spaced relationship about base 10, and extend inwardly at right angles to their connecting stems, as indicated at 40. The stems 40 mount the hooks 35 above the level of the plates 20 and in a position where they become engaged against and bear into the lower end of a molded piece just above the rim edge thereof, as illustrated by a rim edge 34 of cone 30, in a molding operation as herein described. The holding plates 36 are loosely secured in the cut out or indentation sections 37 in base 10 by means of bars 38. The bars 38 are pieces of strip metal secured by bolts 39 in spaced relationship to base 10. This permits the narrow neck portion 40 connecting hook 35 to plate 36 to be free to slide for a short distance between the depth of the indentation 37 and the top edge 41 where it is stopped by abutting against bolts 39. This feature is understood more clearly by taking Fig. 4 in conjunction with Fig. 2 and Fig. 6. When pressure is applied in the manner as hereinafter described, the hooks 35, which extend at right angles to the stem 40 and imbed themselves into the lower end and slightly above the enlarged rim 34 of the molded material, as 33, and secures the same from damaging movement after release of molding pressure and upon subsequent lifting of the bell housing 42. The indentations 37' are provided in the back areas of several of the plates 20 opposite the point at which the hook 35 connects onto the molded piece 33. This indentation 37 provides sliding space for plate 20 which otherwise might interfere with the proper operation of hook 35.

After placement of the shell 33 over conical form 30, in the manner as indicated, bell housing 42 with its smooth inner lining of heavy vulcanized rubber, or a comparable synthetic plastic as neoprene and the like 43, serving as a resilient plastic mold, is placed over shell 33 and base 10 to align the inner groove 44, in the lower thickened end portion 42', of bell housing 42, with the sealing ring 15. The sealing ring 15 at this stage is in contracted or non-expanded position. The liner 43 has a slight resiliency which gives uniformly under high pressure. For convenience in handling, by an overhead hoist, the bell housing 42 is provided with an eyelet handle 45. A pair of prick punches 46 are provided through the bell housing 42 and rubber inner liner 43 for marking or punching holes in the molded form. Markings or holes may be made upon release of pressure or during the operation of molding. The prick punches 46 are of conventional character comprising a tube 47 secured by nuts 48 and 49 in fluid tight relationship through the bell housing 42 and liner 43. A movable pressure packed stem 50, provided with head 51, extends through the tube 47. A hammer blow on head 51 causes stem 50 to puncture or mark the shell 33 when it is formed.

As shown diagrammatically in Fig. 1 there is illustrated the mold structure which produces molded bulge forms. In detail the basic parts of the structure are the same as provided for in the above description relative to Fig. 6 with the exception of providing a core shaped bell housing 42 and inner liner 43 with a shaped bulge or contour such as that resembling the rounded shape of a bullet.

Figures 3, 4:
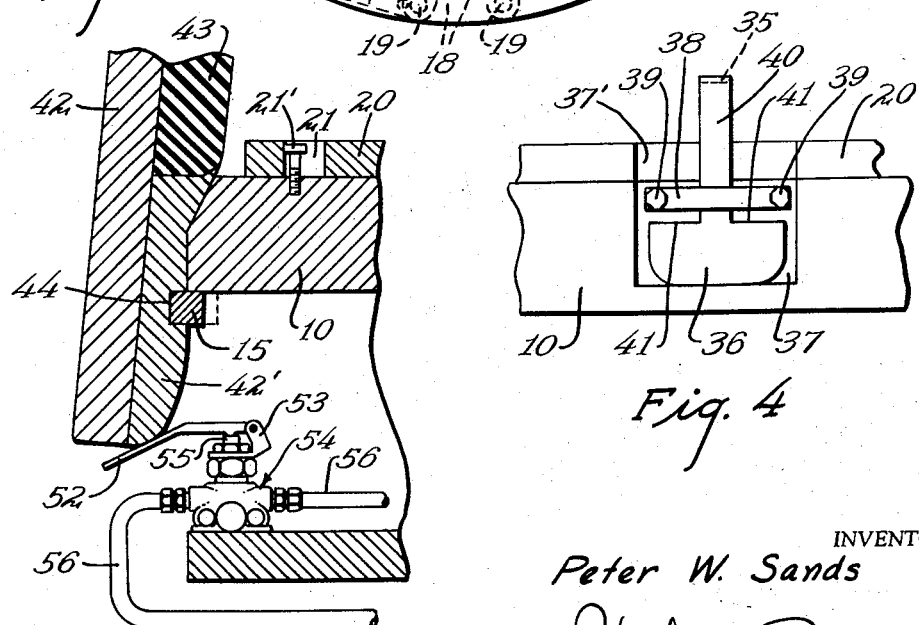
Fig. 3 is a cross sectional partial view of the mold housing, mold base plates and locking ring with an air valve operable by the mold housing.
Fig. 4 is a partial side view of the mold base plate with a lock for a molded form taken on line A—A of Fig. 1.

As shown in Fig. 3 the bell housing end portion 42' when positioned on base 10 pushes against a lever arm 52 pivoted on bracket 53 which is attached to a valve control housing 54. When lever arm 52 is pushed downwardly it presses against a push rod 55 to control the opening and closing of conduit 56 to permit or stop the passage of fluid therethrough. The valve 54 (structure not shown) is of the conventional push button type and operates as a safety feature in the control system as hereinafter described.

Another important feature of control is provided by the structure arrangement shown in Fig. 5 taken in conjunction with Figs. 1 and 2, wherein locking ring 15 carries an attached plate 57 provided with a cam surface 58. The plate 57 is provided with slots 59 through which fastening pins 60 extend and are secured in locking ring 15. The slots 58 provide for some freedom of independent movement on the part of plate 57 in the locking and unlocking reciprocal movement of ring 15. It is the expansion and contraction of ring 15 which causes cam surface 58 to ride over roller 61. Roller 61 is secured on the end of arm 62 which is pivotally connected to bracket 63 attached to valve housing 64. The arm 62 rests against a reciprocal valve release push rod 65 extending into housing 64 to open and close the fluid passageway in conduit 56 for protection of the structural system as hereinafter described.

The operating system for the above described structures is shown diagrammatically in Fig. 1 and the operational features are to be considered in conjunction with the arrangements as disclosed. That is, with a bell housing 42 on platform 10 depressing arm 52 and locking ring 15 then being expanded to cause plate 57 to depress arm 62. To operate the system there is provided a pressure air source 67 which feeds air pressure through conduit 68 to a hand throw valve assembly 69. The arm 70 of valve assembly 69 is operable from the closed position marked "C" to the open position marked "O" to feed air pressure through conduit 71 into conduit 56. The air pressure in conduit 56 actuates an air valve 72 to open conduits 73 and 74 and permit air pressure to enter and actuate the hydraulic cylinder 75. The actuation of hydraulic cylinder 75 by the applied air pressure cause the arms 14 to move outwardly (as described) expanding locking ring 15 into locking groove 44.

The expansion of locking ring 15 depresses arm 62 to open conduit 56, and in cooperation with the opening of the passageway in the valve housing 54, in the manner as described, air pressure passes on through conduit 56 to air pressure valve control 76. The air pressure in valve control 76 trips open a passage between the pressure fluid conduit 23 and feed conduit 77. The feed conduit 77 is supplied with oil under forced pressure from pump 78 which is fed by conduit 79 connected to an oil supply tank 80. The pump 78 is also representative of a relief valve assembly. Motor 81 serves to operate pump 78 through the drive shaft 82. A pressure gauge 83 indicates the pressure in conduit 77. With oil under pressure feeding from conduit 77 into conduit 23 the tube 22 becomes filled and the oil passes through ports 24 into the expansible jacket 26. Jacket 26 expands under the oil pressure forcing the hollow conical rubber form 30 outwardly until the material 33 is shaped and formed against the liner 43 of bell housing 42. Preferably, at this point the marking or prick punches 46 are struck to mark or puncture the molded material.

After the molding operation is finished or the bulging action completed, the hand lever 70 is reversed or thrown to the "C" position, air pressure passes from control valve 69 through conduit 84 to close the oil feed from conduit 77 into conduit 23 and opens a return feed from conduit 23 to conduits 85 and 86 returning oil to tank 80. In the return conduit 86 a pressure reading gauge 87 is provided for reading the return flow pressure under the control of a back pressure adjustable delay action valve. The delay action valve 88 is a patented valve marked with the Patent Number 975,415 and causes a back pressure of the return oil to build up in surge tank or container 88. The back pressure in tank 88 operates through conduit 89 to control the pressure valve 90. Pressure valve 90 is correlated with the control of back pressure delay action valve 88 to open pressure conduit 91 allowing air pressure to be released from cylinder 75 only after the oil pressure is down in the bell housing 42 and tube 22 where no damage can result from the contraction of locking ring 15.

As indicated, the hollow conical shape of the heavy rubber molding cone 30 provides for a contraction starting first at the heavy base portion against the filled oil bag 62 which contraction gradually follows up the length of the metal tube 22 thus squeezing all of the oil back through the ports 24 and into tube 22 where it drains off through conduits 23 and 86 to tank 80. During inactive periods of the mold and with pump 78 in operation a by-pass return flow conduit 92 from the pressure valve control is provided.

A safety light 93 showing the position of locking ring 15 when expanded is provided by the circuit lines 94 connected to the light 93 through a solenoid switch 95 operable by arm 96 when arm 14 expanding locking ring 15 is moved over the roller 97.

From the above description the operation of the structure is apparent and for molding of different sized cone pieces to be joined to form a tubular shaped product it is only necessary to control or vary the size and diameter of the expansible and contractible cone with respect to the bell housing and liner cover. That is a plurality of different molds as herein described forming the same sized cone in each mold may be operated by the same pressure systems for each mold. Thus, simultaneously, there may be formed in a single stage a plurality of uniform cones of different sizes which are joined together in an exact fitting relationship. The control system may be used to operate a single mold unit or a plurality of mold units in combination with the hydraulic molding pressure, as described.

In accordance with the patent statutes, the principles of construction and operation of cone molding have been described and while it has been endeavored to set forth the best embodiment thereof, it is desired to have it understood that obvious changes may be made within the scope of the following claims without departing from the spirit of the present invention.

I claim:

1. A molding device for shaping metals and plastics to uniform conical forms comprising in combination a stationary platform, a plurality of substantially triangular shaped plates each provided with a reinforcing inner edge portion resting on said platform, a tube centered on said platform having inlet and outlet parts at each end, a flexible enclosure about said tube providing a bag forming envelope about one of said inlet and outlet ports, a heavy expansible and contractable conical form about said flexible enclosure having a thinner end section adjacent said one of said inlet and outlet ports and its gradually increasing thicker section extending to a heavy base portion resting on said plates, a conical shaped removable cover provided with lock receiving means in its peripheral inner edge, locking means adjacent said platform cooperable with said lock receiving means for holding the said cover on said platform, hydraulic pressure means for expanding said flexible enclosure and said conical form, and other hydraulic pressure means for controlling the said first hydraulic pressure means.

2. The structure as provided for in claim 1 wherein said reinforcing edge portions on said plates are positioned about said tube and one end of said flexible enclosure and serves as reinforcing members therefore against hydraulic pressures therein.

3. The structure as provided for in claim 2 wherein the said platform contains pins mounted therein and the said plates are provided with elongated slots for mounting said plates on said pins in reciprocal relationship thereto.

4. The structure as provided for in claim 1 wherein said conical shaped removable cover is an integral unit in bulged form.

5. The structure as provided for in claim 1 wherein said lock receiving means is a groove in said removable cover and said locking means is a ring expansible into and contractible from said groove by the cooperation of each of said hydraulic pressure means.

6. The structure as provided for in claim 1 wherein the hydraulic pressure means for expanding said flexible enclosure is an oil under pump pressure and the other hydraulic pressure means for controlling said oil under pump pressure is an air valve operable by air pressure.

7. A molding device for shaping plastic metals to interfitting uniform conical sizes comprising a base support, a liquid pressure tube centered on said base support provided with inlet and outlet passageways at the ends thereof, a flexible bag positioned about said tube and enclosing the ports at one of said ends, tube and bag reinforcing means at the end of said tube opposite the said enclosed ports, a liquid pressure conduit connected to the said tube at the reinforced end thereof, a liquid pressure system for supplying said liquid pressure conduit with a liquid under pressure, a liquid flow valve control in said liquid pressure system, an air pressure system connected to said liquid flow valve for controlling said liquid pressure system, air flow valve control means in said air pressure system, an expansible and self-contractible heavy rubber cone positioned about said bag section, a molding form cover when placed over said rubber cone cooperable with said air flow valve control means, locking means operable by said air pressure system for securing said molding form cover to said base support, a back pressure liquid control in said liquid pressure system, and liquid pressure valve means cooperable with said back pressure liquid control and said air pressure system for stopping the release of said locking means.

8. A molding structure for molding bulged forms comprising a stationary platform serving as a stationary base, a plurality of pins on said base, a plurality of angularly shaped plates resting on said base, said plates being provided with a plurality of slots engaging said pins and holding said plates in movable relationship on said base, a tube on said platform provided with inlet and outlet ports at the ends thereof and one end being encompassed by said plates, a fluid bleeder in said tube, a flexible enclosure about one end of said tube, an expansible and self contractable molding form about said flexible enclosure and of the approximate length of said tube and flexible enclosure about the one end of said tube, a removable mold form having a bulge section, a liner in said mold form, and locking means for securing said mold form to said platform.

9. The structure of claim 8 wherein said platform is provided with a plurality of hooks for engagement with and holding a molded piece on said expansible and self contractable mold form when said removable form is released by said locking means.

10. A molding device for shaping metals and plastics to uniform conical sizes comprising a support means, a conical mold form consisting of a heavy hollow expansible and self-contractible rubber cone having a thick solid rubber base section and a gradually inclined side portion ending in an open cone end of lesser thickness than said base section, a flexible rubber bag in the hollow portion of said cone, a fluid passageway leading to said flexible rubber bag, a shaping mold cover for said cone, and a resilient shaping liner in said mold cover, and locking means on said support means engageable with said molded shape to retain said molded shape upon said support means upon removal of said cover, whereby contraction of said cone and removal of said cover will disengage said molded shape from frictional engagement with the cone and said cover.

11. A molding device for shaping metals and plastics to uniform conical sizes comprising a support means, a conical mold form consisting of a heavy hollow expansible and self-contractible rubber cone having a thick solid rubber base section and a gradually inclined side portion ending in an open cone end of lesser thickness than said base section, a flexible rubber bag in the hollow portion of said cone, a fluid passageway leading to said flexible rubber bag, a shaping mold cover for said cone, and a resilient shaping liner in said mold cover, and a locking means on said support means engageable with said cover for releasably securing said cover to said support means, and additional locking means on said support means engageable with said molded shape to retain said molded shape upon said support means upon removal of said cover, whereby contraction of said cone and removal of said cover will disengage said molded shape from frictional engagement with said cone and said cover.

References Cited in the file of this patent

UNITED STATES PATENTS

| | | |
|---|---|---|
| 1,329,969 | Harrison | Feb. 3, 1920 |
| 1,973,622 | Hand | Sept. 11, 1934 |
| 2,037,795 | Johnson | Apr. 21, 1936 |
| 2,344,779 | Kolderman | Mar. 21, 1944 |
| 2,458,182 | MacDonald | Jan. 4, 1949 |
| 2,696,184 | Demarest | Dec. 7, 1954 |

FOREIGN PATENTS

| | | |
|---|---|---|
| 353,684 | France | Sept. 18, 1905 |